United States Patent
Christensen et al.

(10) Patent No.: US 7,498,100 B2
(45) Date of Patent: Mar. 3, 2009

(54) MULTI-PHASE, SILICON-CONTAINING ELECTRODE FOR A LITHIUM-ION BATTERY

(75) Inventors: Leif Christensen, St. Paul, MN (US); Mark N. Obrovac, Woodbury, MN (US); Dinh B. Le, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 512 days.

(21) Appl. No.: 10/637,412

(22) Filed: Aug. 8, 2003

(65) Prior Publication Data

US 2005/0031957 A1    Feb. 10, 2005

(51) Int. Cl.
*H01M 4/46* (2006.01)
*H01M 4/58* (2006.01)

(52) U.S. Cl. ............... 429/218.1; 429/221; 429/66
(58) Field of Classification Search ............ 429/218.1, 429/221, 66
See application file for complete search history.

(56) References Cited

U.S. PATENT DOCUMENTS

| | | | |
|---|---|---|---|
| 5,504,128 A | 4/1996 | Mizutani et al. | |
| 5,536,599 A | 7/1996 | Alamgir et al. | |
| 5,709,968 A | 1/1998 | Shimizu | |
| 5,763,119 A | 6/1998 | Adachi | |
| 5,858,573 A | 1/1999 | Abraham et al. | |
| 5,882,812 A | 3/1999 | Visco et al. | |
| 5,900,385 A | 5/1999 | Dahn et al. | |
| 6,004,698 A | 12/1999 | Richardson et al. | |
| 6,045,952 A | 4/2000 | Kerr et al. | |
| 6,090,505 A | 7/2000 | Shimamura et al. | |
| 6,203,944 B1 | 3/2001 | Turner et al. | |
| 6,235,427 B1 | 5/2001 | Idota et al. | |
| 6,387,571 B1 | 5/2002 | Lain et al. | |
| 6,432,585 B1 | 8/2002 | Kawakami et al. | |
| 6,436,578 B2 | 8/2002 | Turner et al. | |
| 6,506,520 B1 | 1/2003 | Inoue et al. | |

(Continued)

FOREIGN PATENT DOCUMENTS

EP    0 883 199 A1    12/1998

(Continued)

OTHER PUBLICATIONS

Davies, "Metallic glass formation", *Amorphous Metallic Alloys*, Chapter 2, pp. 8-25, F. E. Luborsky, ed., Butterworth & Co., 1983.

(Continued)

*Primary Examiner*—Tracy Dove
(74) *Attorney, Agent, or Firm*—Stephen F. Wolf

(57) ABSTRACT

An electrode composition for a lithium-ion battery comprising particles having an average particle size ranging from 1 μm to 50 μm. The particles include an electrochemically active phase and an electrochemically inactive phase that share a common phase boundary. The electrochemically active phase includes elemental silicon and the electrochemically inactive phase includes at least two metal elements in the form of an intermetallic compound, a solid solution, or combination thereof. Each of the phases is free of crystallites that are greater than 1000 angstroms prior to cycling. In addition, the electrochemically active phase is amorphous after the electrode has been cycled through one full charge-discharge cycle in a lithium-ion battery.

19 Claims, 6 Drawing Sheets

U.S. PATENT DOCUMENTS

| | | |
|---|---|---|
| 6,548,208 B1 | 4/2003 | Kasamatsu et al. |
| 6,551,744 B1 | 4/2003 | Ohzuku et al. |
| 6,599,663 B2 | 7/2003 | Hashimoto et al. |
| 6,664,004 B2 | 12/2003 | Krause et al. |
| 6,680,145 B2 | 1/2004 | Obrovac et al. |
| 6,699,336 B2 | 3/2004 | Turner et al. |
| 6,730,434 B1 | 5/2004 | Kawakami et al. |
| 6,964,828 B2 | 11/2005 | Lu et al. |
| 7,078,128 B2 | 7/2006 | Lu et al. |
| 7,169,328 B2 * | 1/2007 | Miller et al. ................ 252/500 |
| 2002/0031708 A1 | 3/2002 | Krause et al. |
| 2002/0162606 A1 | 11/2002 | Turner et al. |
| 2003/0108793 A1 | 6/2003 | Dahn et al. |
| 2003/0134198 A1 | 7/2003 | Sawa et al. |
| 2004/0058240 A1 | 3/2004 | Christensen |
| 2004/0121234 A1 | 6/2004 | Le |
| 2004/0179993 A1 | 9/2004 | Dahn et al. |
| 2005/0112054 A1 | 5/2005 | Eberman et al. |
| 2005/0191556 A1 | 9/2005 | Kim et al. |
| 2005/0221196 A1 | 10/2005 | Dahn et al. |
| 2006/0099506 A1 | 5/2006 | Krause et al. |
| 2006/0263695 A1 | 11/2006 | Dahn et al. |
| 2006/0263697 A1 | 11/2006 | Dahn et al. |

FOREIGN PATENT DOCUMENTS

| | | | |
|---|---|---|---|
| EP | 1 028 476 | | 8/2000 |
| EP | 1 039 568 A1 | | 9/2000 |
| EP | 1 274 140 | | 1/2003 |
| JP | 61-066369 | | 4/1986 |
| JP | 10-46299 | | 2/1998 |
| JP | 2000-113912 | | 4/2000 |
| JP | 2000-273853 | | 10/2000 |
| JP | 2001-015102 | | 1/2001 |
| JP | 2001-256974 | | 9/2001 |
| JP | 2001-297757 | | 10/2001 |
| JP | 2002-75351 | | 3/2002 |
| JP | 2003-346793 | | 12/2003 |
| WO | WO 94/11138 | | 5/1994 |
| WO | WO 99/49532 | | 9/1999 |
| WO | WO 00/14817 | | 3/2000 |
| WO | WO 00/33402 | * | 6/2000 |
| WO | WO 01/29920 A1 | | 4/2001 |
| WO | WO 01/52337 | | 7/2001 |
| WO | WO 02/052664 A2 | | 7/2002 |
| WO | WO 2004/086539 A1 | | 10/2004 |
| WO | WO 2005/013397 A1 | | 2/2005 |
| WO | WO 2006/028583 A2 | | 3/2006 |

OTHER PUBLICATIONS

Wilson et al., "Lithium Insertion in Carbons Containing Nanodispersed Silicon", *J. Electrochem. Soc.*, vol. 142, No. 2, Feb. 1995, pp. 326-332.

Yang et al., "Small particle size multiphase Li-alloy anodes for lithium-ion-batteries", *Solid State Ionics* 90 (1996) 281-287.

Besenhard et al., "Will advanced lithium-alloy anodes have a chance in lithium-ion batteries?", *Journal of Power Sources* 68 (1997) 87-90.

Dahn et al., "Economical Sputtering System To Produce Large-Size Composition-Spread Libraries Having Linear and Orthogonal Stoichiometry Variations", *Chem. Mater.*, 14, 2002, pp. 3519-3523.

Egashira et al., "Properties of containing Sn nanoparticles activated carbon fiber for a negative electrode in lithium batteries", *Journal of Power Sources* 107 (2002) 56-60.

Beaulieu et al., "The Electrochemical Reaction of Li with Amorphous Si-Sn Alloys", *J. Electrochem. Soc.*, 150 (2) A149-A156 (2003).

Cumyn et al., "Design and Testing of a Low-Cost Multichannel Pseudopotentiostat for Quantitative Combinatorial Electrochemical Measurements on Large Electrode Arrays", *Electrochemical and Solid-State Letters*, 6 (6) E15-E18 (2003).

Fleischauer et al., "Design and Testing of a 64-Channel Combinatorial Electrochemical Cell", *J. Electrochem. Soc.*, 150 (11): A1465-A1469 (2003).

Sakaguchi et al., "Ce-Sn intermetallic compounds as new anode materials for rechargeable lithium batteries", *Journal of Power Sources* 119-121 (2003) 50-55.

Tirado, "Inorganic materials for the negative electrode of lithium-ion batteries: state-of-the-art and future prospects", *Materials Science and Engineering R* 40 (2003) 103-136.

Obrovac et al., "Structural Changes in Silicon Anodes during Lithium Insertion/Extraction", *Electrochemical and Solid-State Letter*, 7 (5) A93-A96 (2004).

Dahn et al., "The Impact of the Addition of Rare Earth Elements to $Si_{1-x}Sn_x$ Negative Electrode Materials for Li-Ion Batteries", *J. Electrochem. Soc.*, 153 (6) A1211-A1220 (2006).

Dahn et al., "Rechargeable Lithium-ion Cell with Triphenylamine Redox Shuttle", U.S. Appl. No. 60/743,314, filed Feb. 17, 2006.

* cited by examiner

MULTI-PHASE, SILICON-CONTAINING ELECTRODE FOR A LITHIUM-ION BATTERY

TECHNICAL FIELD

This invention relates to electrode compositions useful in lithium-ion batteries.

BACKGROUND

Various metals, metalloids, and alloys have been investigated for use as active anode compositions for lithium-ion batteries. These materials are attractive because they potentially have higher gravimetric and volumetric capacities than carbon and graphite, both of which are currently used as anodes in lithium-ion batteries. One problem with these materials, however, is that they experience large volume expansion during battery operation as a result of lithiation and delithiation. This volume expansion, in turn, causes the materials to deteriorate, thus limiting cycle life. In addition, the methods used to prepare these materials do not always lend themselves readily to large-scale manufacturing.

SUMMARY

The invention provides electrode compositions suitable for use in lithium-ion batteries in which the electrode compositions exhibit high capacities and good cycle life. In addition, the electrode compositions, and batteries incorporating them, are readily manufactured.

To achieve these objectives, the invention features, in a first aspect, an electrode composition that includes particles having an average particle size ranging from 1 μm to 50 μm, in which the particles comprise an electrochemically active phase and an electrochemically inactive phase that share at least one common phase boundary. The electrochemically active phase comprises elemental silicon and the electrochemically inactive phase comprises at least two metal elements in the form of an intermetallic compound, a solid solution, or combination thereof. In some embodiments, the electrochemically inactive phase further comprises silicon. Each of the phases is free of crystallites that are greater than 1000 angstroms prior to cycling. Moreover, the electrochemically active phase is amorphous after the electrode has been cycled through one full charge-discharge cycle in a lithium-ion battery. Preferably, the electrochemically active phase remains amorphous during additional charge-discharge cycles when the voltage is greater than 70 mV vs. Li/Li$^+$, more preferably greater than 50 mV vs. Li/Li$^+$.

An "electrochemically active" material is a material that reacts with lithium under conditions typically encountered during charging and discharging in a lithium-ion battery. An "electrochemically inactive" material is a material that does not react with lithium under those conditions.

An "amorphous" material is a material that lacks the long range atomic order characteristic of crystalline material, as observed by x-ray diffraction or transmission electron microscopy.

The electrode composition may be prepared according to a process that includes (a) melting together elemental silicon and two or more additional metal elements in an inert atmosphere to form an ingot; (b) melting the ingot in an inert atmosphere to form a molten stream; (c) rapidly quenching the molten stream on the surface of a rotating wheel to form a ribbon; and (d) pulverizing the ribbon to form particles having an average particle size ranging from 1 μm to 50 μm.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
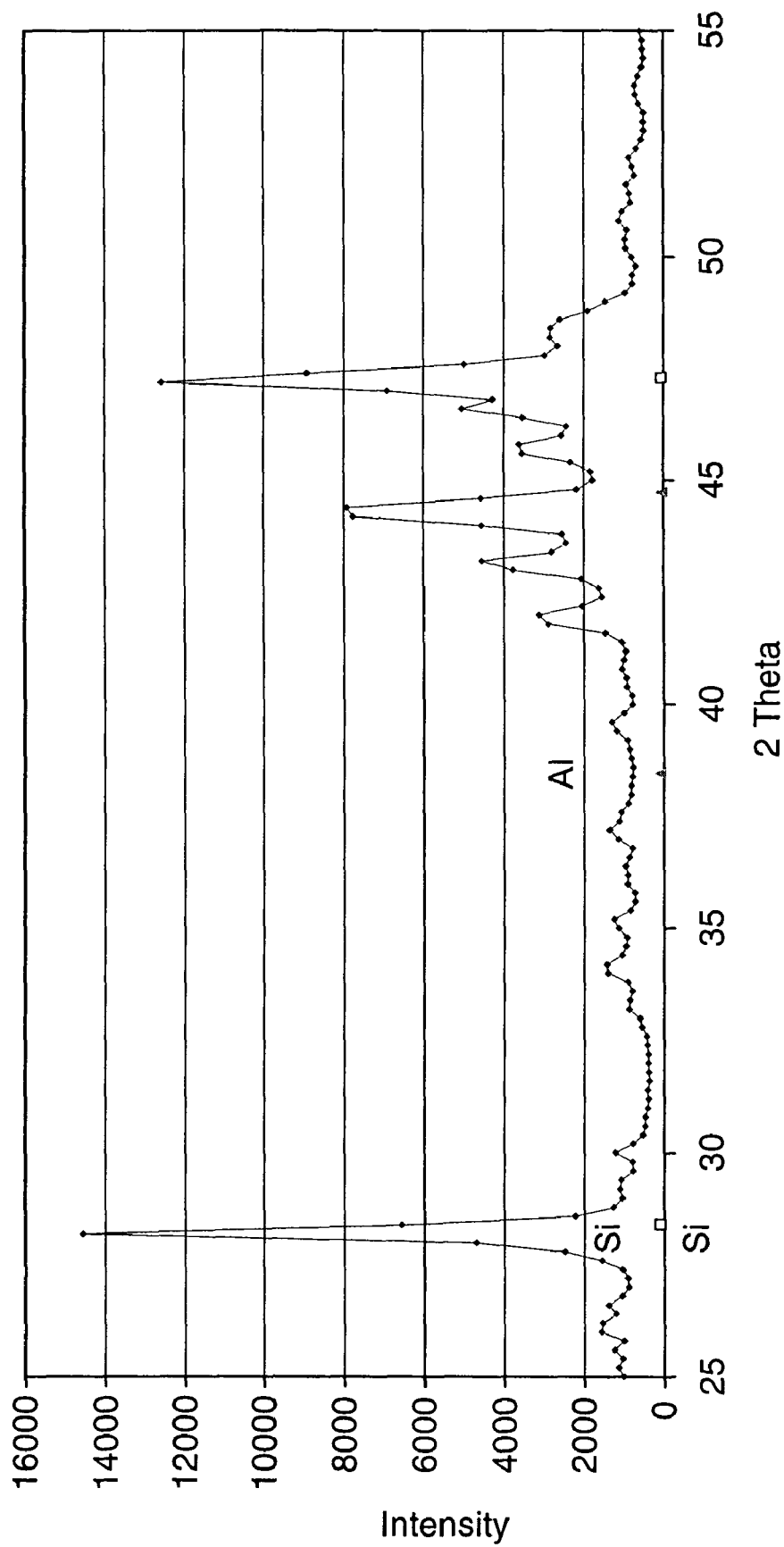
FIG. 1 is an x-ray diffraction profile for the melt-spun silicon-aluminum-iron powder described in Example 1.

Electrode compositions are described that are particularly useful as anodes for lithium-ion batteries. The electrode compositions feature an electrochemically active phase that includes elemental silicon and an electrochemically inactive phase that includes two or more metal elements and, preferably, silicon. Examples of suitable metal elements include iron, aluminum, nickel, manganese, cobalt, copper, silver, and chromium, with iron, copper, and aluminum being particularly preferred. The two phases have the microstructure described in the Summary, above.

The electrode compositions are preferably prepared by a chill block melt spinning process. Such processes are described generally, for example, in "Amorphous Metallic Alloys," F. E. Luborsky, ed., Chapter 2, Butterworth & Co., Ltd. (London), 1983. According to this process, ingots containing silicon and two or more metal elements are melted in a radio frequency field and then ejected through a nozzle onto the surface of a rotating metal wheel (e.g., a copper wheel). Because the surface temperature of the copper wheel is substantially lower than the temperature of the melt, contact with the surface of the wheel quenches the melt. Quenching prevents the formation of large crystallites that are detrimental to electrode performance.

The electrode compositions are particularly useful as anodes for lithium-ion batteries. To prepare a battery, the electrode is combined with an electrolyte and a cathode (the counterelectrode). The electrolyte may be in the form of a liquid, solid, or gel. Examples of solid electrolytes include polymeric electrolytes such as polyethylene oxide, polytetrafluoroethylene, fluorine-containing copolymers, and combinations thereof. Examples of liquid electrolytes include ethylene carbonate, diethyl carbonate, propylene carbonate, and combinations thereof. The electrolyte is provided with a lithium electrolyte salt. Examples of suitable salts include LiPF$_6$, LiBF$_4$, and LiClO$_4$. Examples of suitable cathode compositions include LiCoO$_2$, LiCo$_{0.2}$Ni$_{0.8}$O$_2$, and LiMn$_2$O$_4$.

EXAMPLES

Example 1

6.34 g of aluminum shot, 12.10 g of silicon flakes, and 6.56 g of iron flakes (all 99.9% or better purity) were weighed in a weighing dish and then placed in an arc furnace. The mixture was melted in an Ar atmosphere in the presence of a Ti pool oxygen getter to yield 25 g of an ingot having the composition $Si_{55}Al_{30}Fe_{15}$, where all amounts are in atomic percent.

The ingot was broken into pieces less than 15 mm in diameter. 10 g of this material was placed inside a quartz tube ending in a 0.035 mil (0.89 μm) diameter nozzle. A thin carbon sleeve was also inserted in the tube as a radio frequency coupler to initiate melting of the ingot. The tube was placed in the chamber of a melt spinner above a 200 mm diameter copper wheel such that the distance from the nozzle orifice to the wheel surface was 10 mm. The chamber was then evacuated to 80 mTorr and backfilled with He to 200 Torr. The ingot was then melted in a radio frequency field. When the melt had reached 1150° C., the molten liquid was ejected at 80 Torr He overpressure onto the copper wheel rotating at a surface speed of 35 m/sec to quench the melt and form ribbon fragments. Approximately 9 g of ribbon fragments were collected.

The ribbon fragments were pulverized by ball milling in an aqueous slurry in a planetary mill for 1 hour to form a powder. After air-drying at 80° C. in an oven, the powder was classified by sieving through sieves having pore sizes of 53 microns, 32 microns, and 20 microns. The fraction between 32 and 53 microns was selected for further investigation. Its x-ray diffraction pattern was collected using a Siemens Model Kristalloflex 805 D500 diffractometer equipped with a copper target x-ray tube and a diffracted beam monochromator. The results are shown in FIG. 1. Analysis of the peak widths suggests a crystallite size of 494 angstroms for the elemental silicon phase and 415 angstroms for the iron and aluminum-containing phase.

Figure 3:
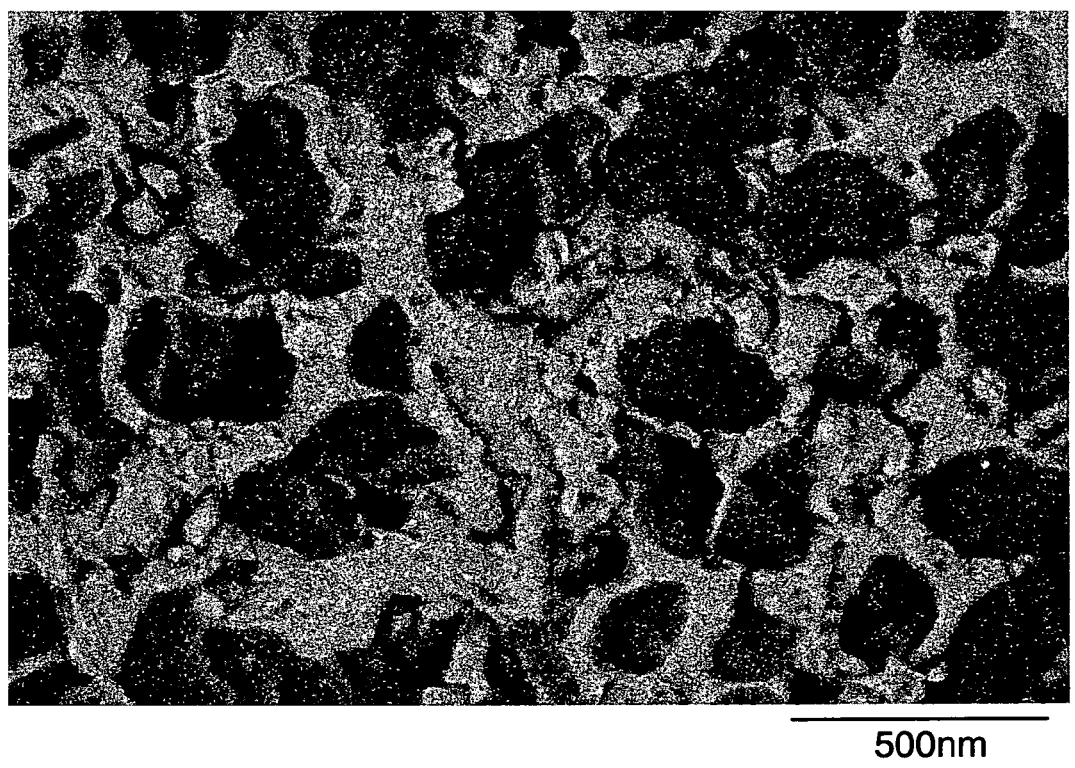
FIG. 3 is a scanning electron microscope (SEM) photograph of the melt-spun silicon-aluminum-iron powder described in Example 1.

FIG. 3 is a scanning electron microscopy (SEM) photograph of the classified powder. As shown in FIG. 3, the microstructure of the powder features discrete regions of elemental silicon that share a phase boundary with regions of the silicon-aluminum-iron ternary alloy.

The remaining ingot material, which had not been subjected to melt spinning, was similarly pulverized to form a powder and classified, and the x-ray diffraction pattern of the fraction between 32 and 53 microns measured. Analysis of peak widths suggests a crystallite size of 1243 angstroms for the elemental silicon and 732 angstroms for the remaining components. Melt-spinning, therefore, resulted in the formation of materials with significantly smaller crystallite sizes.

To prepare electrodes for electrochemical cycling, 0.8 g of each powder was suspended in 1 g of N-methyl-2-pyrrolidinone (NMP). Next, 3.6 g of a 6% solids suspension of super P carbon (available from MMM, Belgium) in NMP and polyvinylidene fluoride (Kynar 461, available from Elf Atochem), 1:1 by weight, were added to the powder suspension. The resulting suspension was stirred at high shear for 5 minutes, and then coated onto a 12 mil (0.305 mm) copper foil with a notch bar to provide an 80% active, 10% polyvinylidene fluoride, 10% super P carbon coating. The coating was dried in vacuo at 150° C. for 4 hours to form the electrode. The electrode was then used to construct 2325 coin cells by combining it with a metallic lithium anode, two layers of Cellgard 2400 as the separator, and 1 M $LiPF_6$ in a 1:2 mixture of ethylene carbonate and diethyl carbonate as the electrolyte.

Figure 2:
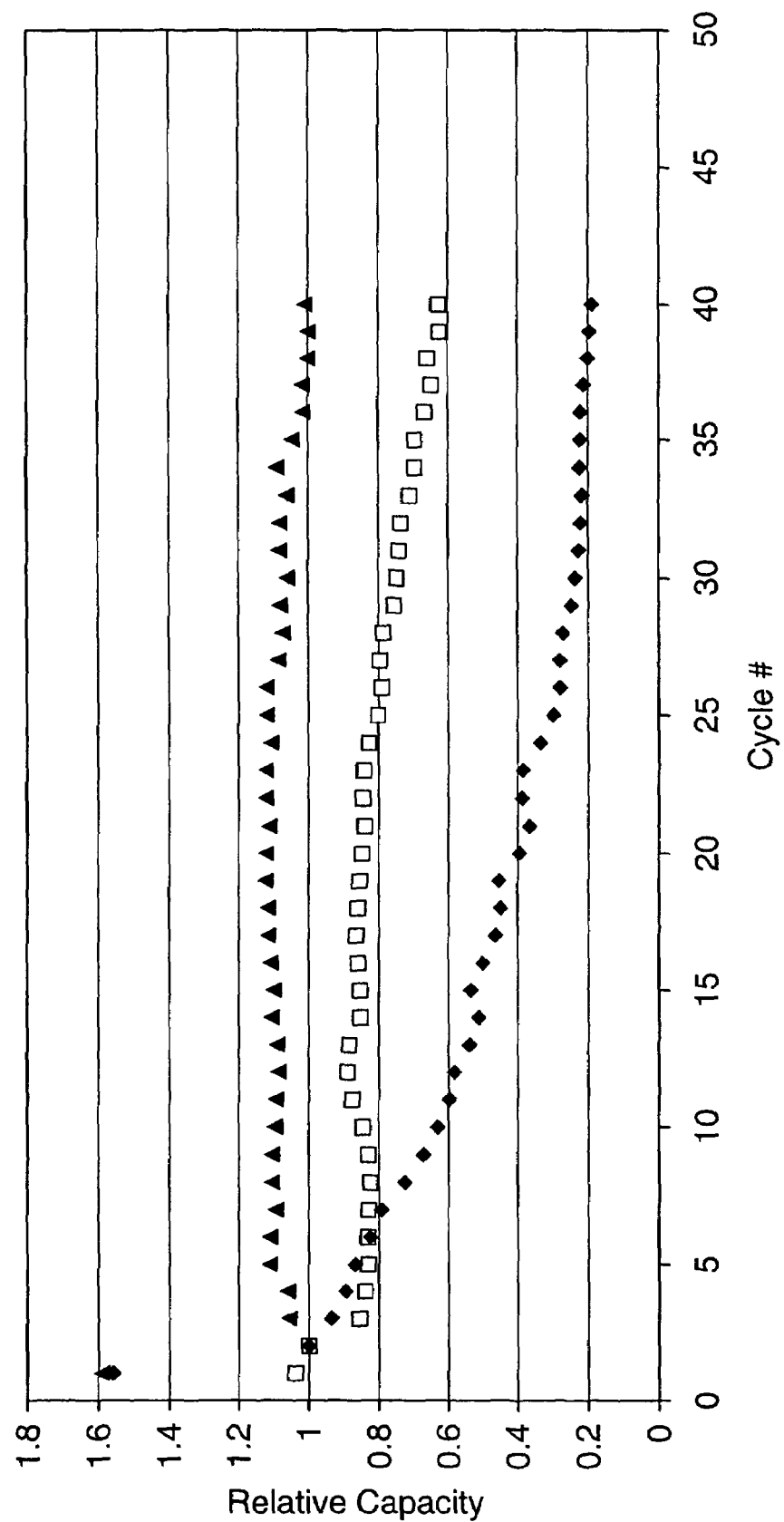
FIG. 2 illustrates the cycling performance, in terms of capacity vs. cycle number, for half-cells based upon the melt-spun and non-melt spun silicon-aluminum-iron powders described in Example 1.

The cells were cycled using a MACCOR cycler at a constant current of 0.125 mA between 0.9V and 0.025V for the first cycle, and at a constant current of 0.5 mA between 0.9V and either 0.050V or 0.005V for all additional cycles. The results are shown in FIG. 2. As shown in the figure, the performance of the melt-spun material (black triangles), with its smaller crystallites, was superior to the performance of the non-melt spun material (black diamonds). In addition, enhanced performance was observed for voltages above about 50 mV. Specifically, the melt-spun material exhibited an average coulombic efficiency of 99.3% when cycled to 50 mV (black triangles). However, that value dropped to 98.2% when the material was cycled to 5 mV (open squares).

Figure 4:
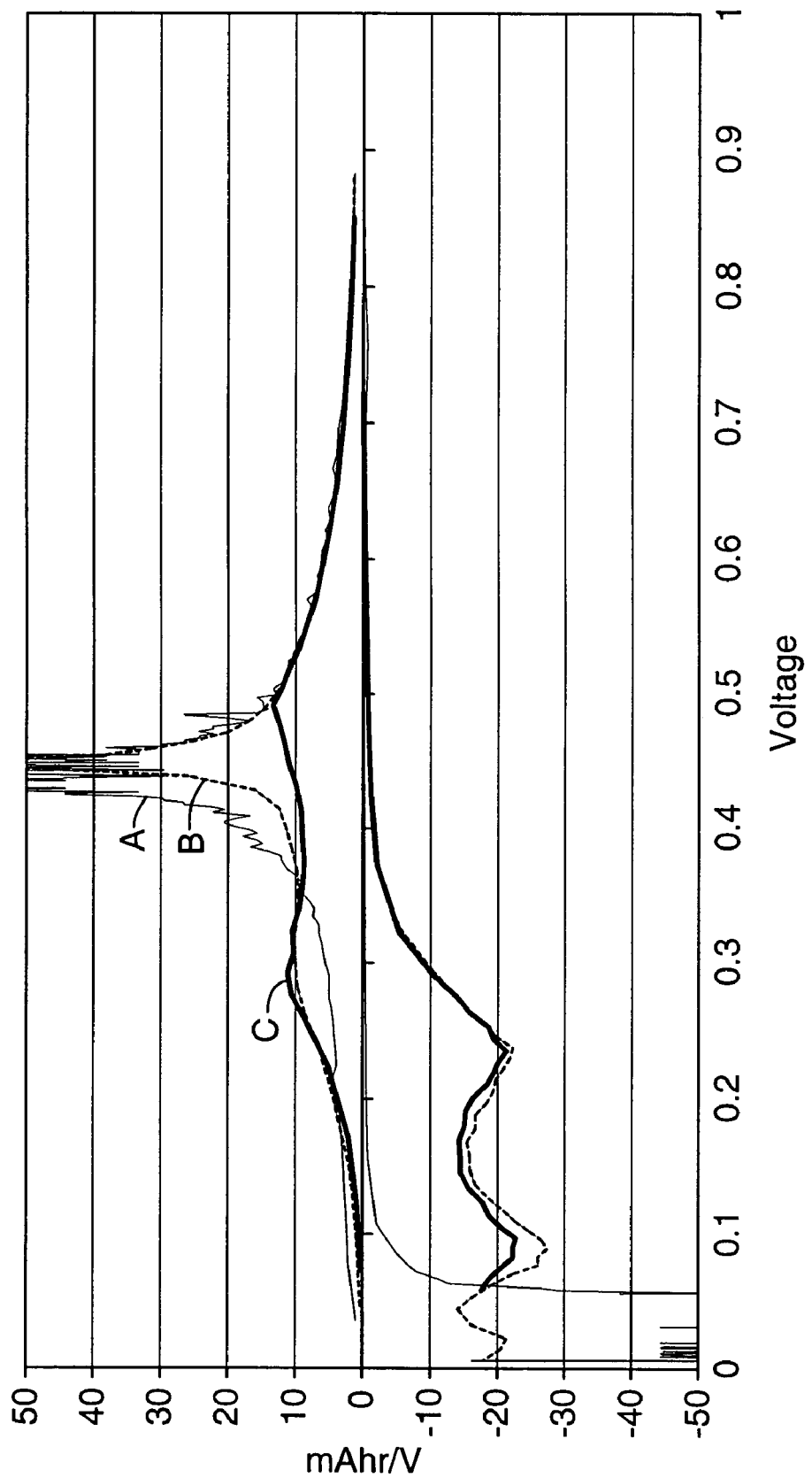
FIG. 4 illustrates the differential capacity vs. voltage for a half-cell based upon the melt-spun silicon-aluminum-iron powder described in Example 1.

The differential capacity curve of FIG. 4 contains three curves. Curve (a) represents results obtained after one cycle. Curve (b) represents results obtained after two cycles. Curve (c) represents results obtained when lithiation was limited to 50 mV. The results illustrate that the amorphous silicon phase of the melt-spun material remains amorphous when lithiation is limited to about 50 mV. Values below 50 mV, on the other hand, result in the formation of crystalline silicon.

Figure 5:
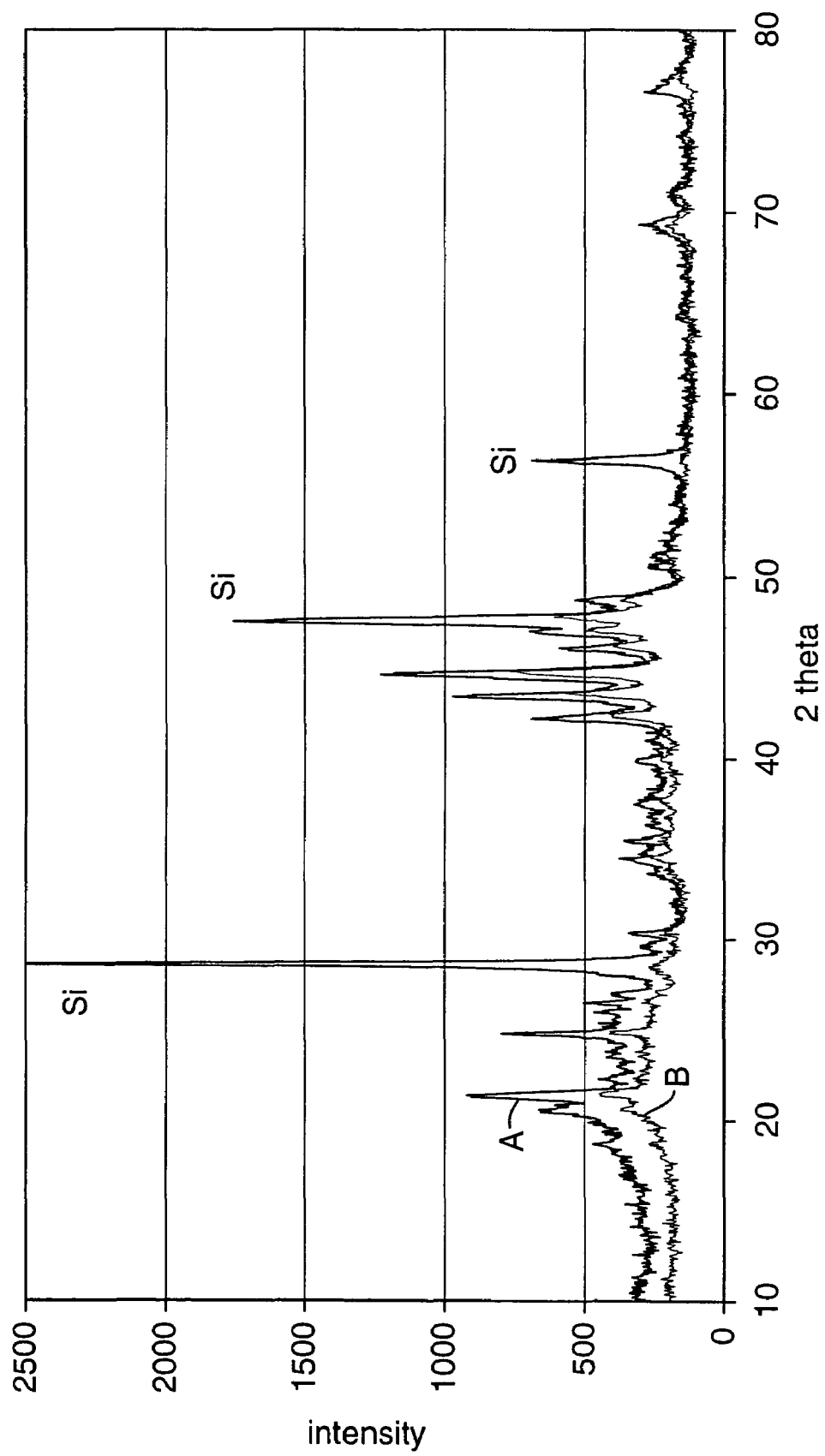
FIG. 5 is an x-ray diffraction profile of the melt-spun silicon-aluminum-iron powder described in Example 1 prior to cycling and after 35 cycles.

FIG. 5 compares the x-ray diffraction pattern of the anode prior to the first cycle (trace (a)) and after 35 cycles (trace (b)). As shown in the figure, after 35 cycles the silicon phase was amorphous, but the crystallite size of the silicon-aluminum-iron phase remained substantially unchanged.

Example 2

Melt spun $Si_{55}Al_{30}Fe_{15}$ ribbon was prepared, pulverized, and classified as described in Example 1. The fraction between 32 and 20 microns was isolated. A portion of this fraction of core material in the form of particles was coated with a porous layer of Ag according to the procedure described in Krause et al., U.S. Ser. No. 09/883,865 filed Jun. 18, 2001 and entitled "Electrode Compositions Having Improved Cycling Behavior," which is assigned to the same assignee as the present application, and hereby incorporated by reference in its entirety, and which is described below. The weight uptake was 10%. The silver-coated particles were dispersed in methyl ethyl ketone and further reacted with 3-aminopropyltrimethyoxysilane (Aldrich Chemical) (60 mg silane per 1 g of powder) by shaking for 8 hours.

Figure 6:
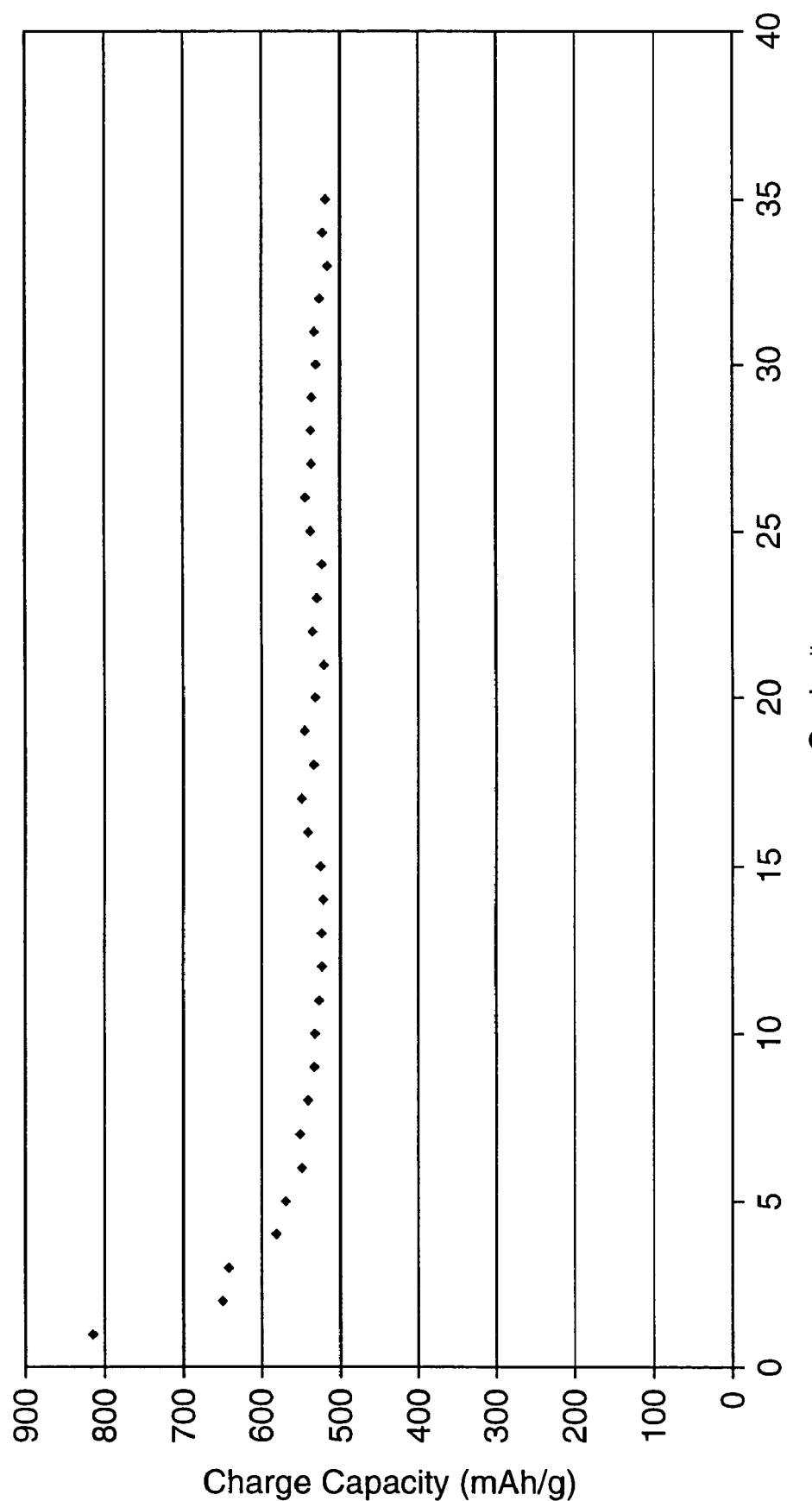
FIG. 6 is a plot of capacity vs. cycle number for the powder described in Example 2.

The treated powder was used to prepare electrodes as described in Example 1 except that the binder was a fluorochemical elastomer available from Dyneon LLC under the name FC-2179, the carbon was Super S carbon, and the final coating composition contained 80% active powder, 14% carbon, and 6% binder. The performance of half cells incorporating these electrodes, in terms of capacity vs. cycle number, is shown in FIG. 6. The half cells were prepared as described in Example 1. As shown in FIG. 6, the cells exhibited good cycling performance.

Electroless Plating Procedure

The following procedure produces an electrode having a 20% by weight silver plating on the core. Platings having different silver levels are prepared by varying the amount of plating reagent used.

A plating reagent was prepared by dissolving 0.26 grams of KOH in 100 ml of deionized water, followed by the addition of 1.32 ml of ammonium hydroxide and 0.59 grams of silver nitrate ($AgNO_3$). The combination of the silver nitrate and the ammonium hydroxide forms the active compound $Ag(NH_3)_2$ from which the silver is plated after the addition of a reducing sugar.

A 0.5 gram sample of the core material in the form of particles was placed in a vial with a 26 ml aliquot of the silver nitrate solution and stirred at a speed sufficient to keep the particulate material from settling out. The amount of reagent was selected to produce a plating having 20% silver by weight. The plating process was initiated by rapidly adding 6.6 mls of a 25 g/liter solution of dextrose to the swirling vortex of the stirred solution in order to disperse the reducing sugar quickly. The plating reaction started immediately and was allowed to progress at least 30 minutes under rapid agitation, after which a centrifuge was used to separate the particulate matter. The remaining spent solution was decanted away. After several water washes in the centrifuge, the plated material was allowed to dry in an oven at approximately 70° C. overnight. The resulting material was easily powdered and displayed a color change indicating a successful plating operation.

Example 3

6.98 g of aluminum shot, 14.80 g of silicon flakes, and 8.22 g of copper shot (all 99.9% or better purity) were weighed in a weighing dish and then placed in an arc furnace. The mixture was melted in an Ar atmosphere in the presence of a Ti pool oxygen getter to yield a 30 g ingot having the composition $Si_{57}Al_{28}Cu_{14}$, where all amounts are in atomic percent.

The ingot was broken into pieces less than 15 mm in diameter. 10 g of this material was placed inside a carbon tube ending in a 0.030 mil (0.76 μm) diameter nozzle. The tube was placed in the chamber of a melt spinner above a 200 mm diameter copper wheel such that the distance from the nozzle orifice to the wheel surface was 10 mm. The chamber was then evacuated to 80 mTorr and backfilled with He to 200 Torr. The ingot was then melted in a radio frequency field. When the melt had reached 1200° C., the molten liquid was ejected at 80 Torr He overpressure onto the copper wheel rotating at a surface speed of 35 m/sec to quench the melt and form ribbon fragments. Approximately 9 g of ribbon fragments were collected.

The ribbon fragments were pulverized by grinding in a mortar and pestle. The powder was classified by sieving through sieves having pore sizes of 53 microns, 32 microns, and 20 microns. The fraction between 32 and 53 microns was selected for further investigation. Its x-ray diffraction pattern was collected using a Siemens Model Kristalloflex 805 D500 diffractometer equipped with a copper target x-ray tube and a diffracted beam monochromator. The XRD pattern showed the presence of only the phases Si and $Al_2Cu$. Analysis of the peak widths suggests a crystallite size of 395 angstroms for the elemental silicon phase and 270 angstroms for the $Al_2Cu$ phase.

The powder sample was made into a coated electrode, incorporated into an electrochemical cell, and cycled as described for the powder sample in Example 1. Cycling was done by constant current (0.25 mA) charge and discharge between 0.9 V and 0.05 V for the first cycle, and 0.9V and 0.070 V for all additional cycles. The cell had a first discharge capacity of 1680 mAh/g and had a differential capacity curve showing only the characteristics of fully amorphous silicon after the first cycle.

To confirm that the $Al_2Cu$ phase was electrochemically inactive, 9.18 g of aluminum and 10.82 g of copper (all 99.9% or better purity) were placed in an arc furnace. The mixture was melted in an Ar atmosphere in the presence of a Ti pool oxygen getter to yield a 20 g ingot having the composition $Al_2Cu$. The ingot was ground with a mortar and pestle, and classified by sieving through sieves having pore sizes of 53 microns, 32 microns, and 20 microns. The fraction between 32 and 53 microns was selected for further investigation. Its x-ray diffraction pattern, which was collected as described above, corresponded to that of the $Al_2Cu$ phase.

The powder sample was made into a coated electrode, incorporated into an electrochemical cell, and cycled as described above. Cycling was done by constant current (0.25 mA) charge and discharge between 0.9 V and 0.005 V. The cell showed no capacity from the $Al_2Cu$ phase, establishing that it was electrochemically inactive.

A number of embodiments of the invention have been described. Nevertheless, it will be understood that various modifications may be made without departing from the spirit and scope of the invention. Accordingly, other embodiments are within the scope of the following claims.

What is claimed is:

1. An electrode composition comprising particles having an average particle size ranging from 1 μm to 50 μm, said particles comprising an amorphous electrochemically active phase and an electrochemically inactive phase that share at least one common phase boundary, said electrochemically active phase comprising elemental silicon and said electrochemically inactive phase comprising at least two metal elements in the form of an intermetallic compound, a solid solution, or combination thereof, wherein
   one of the metal elements in said electrochemically inactive phase is aluminum.

2. An electrode composition according to claim 1, wherein said electrochemically inactive phase further comprises silicon.

3. An electrode composition according to claim 1, wherein said electrochemically inactive phase comprises at least one metal element selected from the group consisting of iron, nickel, manganese, cobalt, copper, silver, and chromium.

4. An electrode composition according to claim 3, wherein said electrochemically inactive phase further comprises silicon.

5. An electrode composition according to claim 1, wherein said electrochemically inactive phase comprises silicon, aluminum, and iron.

6. An electrode composition according to claim 1, wherein said electrochemically inactive phase comprises aluminum and copper.

7. A lithium-ion battery comprising:
   (a) an anode comprising particles having an average particle size ranging from 1 μm to 50 μm, said particles comprising an amorphous electrochemically active phase and an electrochemically inactive phase that share at least one common phase boundary, said electrochemically active phase comprising elemental silicon and said electrochemically inactive phase comprising at least two metal elements in the form of an intermetallic compound, a solid solution, or combination thereof, wherein
   one of the metal elements in said electrochemically inactive phase is aluminum;
   (b) a cathode; and
   (c) an electrolyte separating the anode and the cathode.

8. A battery according to claim 7, wherein said electrochemically inactive phase further comprises silicon.

9. A battery according to claim 7, wherein said electrochemically inactive phase comprises at least one metal elements selected from the group consisting of iron, nickel, manganese, cobalt, copper, silver, and chromium.

10. A battery according to claim 9, wherein said electrochemically inactive phase further comprises silicon.

11. A battery according to claim 7, wherein said electrochemically inactive phase comprises silicon, aluminum, and iron.

12. A battery according to claim 7, wherein said electrochemically inactive phase comprises aluminum and copper.

13. A method for preparing an electrode composition for a lithium-ion battery comprising:
(a) melting together elemental silicon and two or more additional metal elements in an inert atmosphere to form an ingot;
(b) melting the ingot in an inert atmosphere to form a molten stream;
(c) rapidly quenching the molten stream on the surface of a rotating wheel to form a ribbon;
(d) pulverizing the ribbon to form particles having an average particle size ranging from 1 μm to about 50 μm,
(e) coating the particles onto a current collector to form an electrode;
(f) incorporating the electrode into a lithium-ion battery: and
(g) cycling the battery at least one time through at least one charge-discharge cycles at a voltage greater than 50mV vs. Li/Li$^+$, wherein
said particles, after cycling, comprising an amorphous electrochemically active phase and an electrochemically inactive phase that share at least one common phase boundary, said electrochemically active phase comprising elemental silicon and said electrochemically inactive phase comprising at least two metal elements in the form of an intermetallic compound, a solid solution, or combination thereof, wherein
one of the metal elements in said electrochemically inactive phase is aluminum.

14. A method according to claim 13, wherein said electrochemically inactive phase further comprises silicon.

15. A method according to claim 13, wherein the metal elements are selected from the group consisting of aluminum, iron, nickel, manganese, cobalt, copper, silver, and chromium.

16. An electrode composition comprising particles having an average particle size ranging from 1 μm to 50 μm, said particles comprising an amorphous electrochemically active phase and an electrochemically inactive phase that share at least one common phase boundary, said electrochemically active phase comprising elemental silicon and said electrochemically inactive phase comprising at least two metal elements in the form of an intermetallic compound, a solid solution, or combination thereof, wherein an electrically conductive layer at least partially covers the particles, and wherein
one of the metal elements in said electrochemically inactive phase is aluminum.

17. An electrode composition made according to the method of claim 13.

18. The electrode composition according to claim 17 wherein the electrochemically inactive phase further comprises silicon.

19. The electrode composition according to claim 17 wherein the metal elements are selected from the group consisting of aluminum, iron, nickel, manganese, cobalt, copper, silver, and chromium.

* * * * *